(12) United States Patent
Pursley

(10) Patent No.: US 8,075,046 B2  
(45) Date of Patent: Dec. 13, 2011

(54) TRUCK-TRAILER AIR DAM

(75) Inventor: Daniel W. Pursley, Loveland, CO (US)

(73) Assignee: Aeromotive Innovations, Loveland, CO (US)

( * ) Notice: Subject to any disclaimer, the term of this patent is extended or adjusted under 35 U.S.C. 154(b) by 63 days.

(21) Appl. No.: 12/321,529

(22) Filed: Jan. 22, 2009

(65) Prior Publication Data

US 2009/0184539 A1 Jul. 23, 2009

Related U.S. Application Data

(60) Provisional application No. 61/011,943, filed on Jan. 23, 2008.

(51) Int. Cl.
*B62D 35/00* (2006.01)

(52) U.S. Cl. ............... 296/180.2; 296/180.3; 296/180.5

(58) Field of Classification Search ............... 296/180.1, 296/180.2, 180.3, 180.4, 180.5; *B60J 1/14, B60J 1/08; B62D 35/00*
See application file for complete search history.

(56) References Cited

U.S. PATENT DOCUMENTS

| | | | |
|---|---|---|---|
| 5,522,637 A * | 6/1996 | Spears | 296/180.3 |
| 5,536,062 A * | 7/1996 | Spears | 296/180.3 |
| 6,428,084 B1 * | 8/2002 | Liss | 296/180.3 |
| 6,932,419 B1 * | 8/2005 | McCullough | 296/180.1 |
| 7,712,822 B2 * | 5/2010 | Pfaff | 296/180.2 |
| 2004/0075298 A1 * | 4/2004 | Wong et al. | 296/180.2 |
| 2006/0103167 A1 * | 5/2006 | Wong et al. | 296/180.1 |

* cited by examiner

*Primary Examiner* — Glenn Dayoan  
*Assistant Examiner* — Sunsurraye Westbrook  
(74) *Attorney, Agent, or Firm* — Craig R. Miles; CR Miles, P.C.

(57) ABSTRACT

An air dam which provides at least one panel which operates between an open condition and a closed condition in the open space established between a truck coupled to a trailer to alter a part of an air stream generated about the truck-trailer during travel.

16 Claims, 5 Drawing Sheets

TRUCK-TRAILER AIR DAM

BACKGROUND

An air dam which provides at least one panel which operates between an open condition and a closed condition in the open space established between a truck coupled to a trailer to alter a part of an air stream generated about the truck-trailer during travel.

Typically, the towing vehicle (often referred to a truck or a tractor) of a truck-trailer (often referred to as a tractor-trailer) provides a wide coupling plate known as a fifth wheel coupling. When the truck and trailer are coupled by the fifth wheel coupling (or other type of coupling) an open space between the truck and the trailer can be defined by the external surfaces of the truck chassis deck (or "deck"), the backside of the tractor and the front side of the trailer. The open space established between the truck and the trailer may not be used for any purpose other than to allow the truck and trailer to articulate about the coupling axis during operation.

A substantial problem of conventional truck-trailer configurations having an open space established between the truck and the trailer may be that the open space disrupts the air stream about the truck-trailer generating resistance to forward travel of the truck-trailer. The disruption of the air stream or the resistance generated by the disruption of the air stream by the open space can increase as the speed of the truck-trailer increases. With the increased price of fuel, it has become ever more important for drivers to utilize a truck-trailer having a configuration which alters the air stream about the truck-trailer to achieve the least or a reduced amount of air stream resistance to travel of the truck-trailer.

Various impediments to providing a solution to the problem of generating a reduced resistance air stream about the open space between the truck and the trailer include a lack of air stream alteration means which operate between an open condition and a closed condition to allow articulation between the truck and the trailer or to provide access and egress of the open space. Additionally, many conventional air dams which completely surround the open space may be prohibitively expensive to utilize or do not generate a substantial reduction in the resistance of the truck-trailer to the air stream because gaps between the air dam and the trailer create additional substantial disruption of air stream which can increase rather than decrease resistance of the truck-trailer during forward travel.

Moreover, it is believed that it was not known prior to the invention described herein that generating an air stream of the proper direction and velocity in the open space between the truck-trailer can be effective in generating a reduced resistance air stream which allows travel of the truck-trailer using a reduced amount of fuel.

The inventive air dam described-herein addresses each of the above-described problems in a practical manner.

SUMMARY OF THE INVENTION

Accordingly, a broad object of the invention can be to provide an air dam which operates to generate a reduced resistance air stream about a truck-trailer during travel.

Another broad object of the invention can be to provide an air dam which alters a part of the air stream in the open space between a truck-trailer during travel which contributes to generation of a reduced resistance air stream.

Another broad object of the invention can be to provide an air dam which operates between an open condition and a closed condition and in the closed condition provides an air diversion element which diverts a part of the air stream about a truck-trailer to establish an open space air stream between the truck and the trailer.

Another broad object of the invention can be to provide an air dam which operates to alter the air stream fluidically engaged with the external surface of a truck-trailer and in the open space between the truck and the trailer resulting in increased miles per gallon of fuel.

Naturally, further objects of the invention are disclosed throughout other areas of the specification, drawings, photographs, and claims.

A BRIEF DESCRIPTION OF THE DRAWINGS

DETAILED DESCRIPTION OF THE PREFERRED EMBODIMENTS

An air dam which provides at least one panel which operates between an open condition and a closed condition in the open space established between a truck coupled to a trailer to alter a part of an air stream generated about the truck-trailer during travel.

Figure 1:
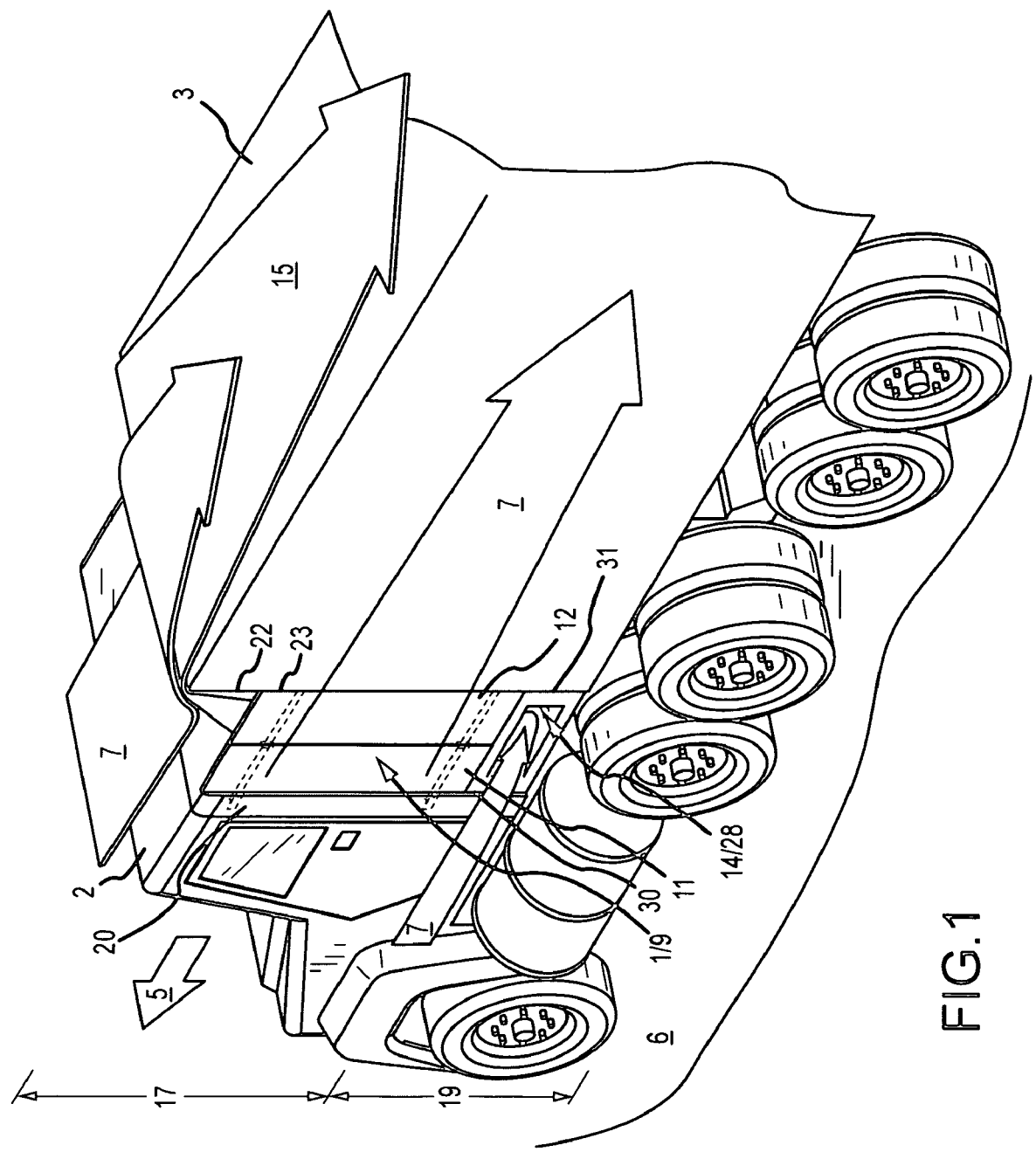
FIG. 1 is a perspective drawing which shows a particular embodiment of the inventive air dam in the closed condition.
Figure 2:
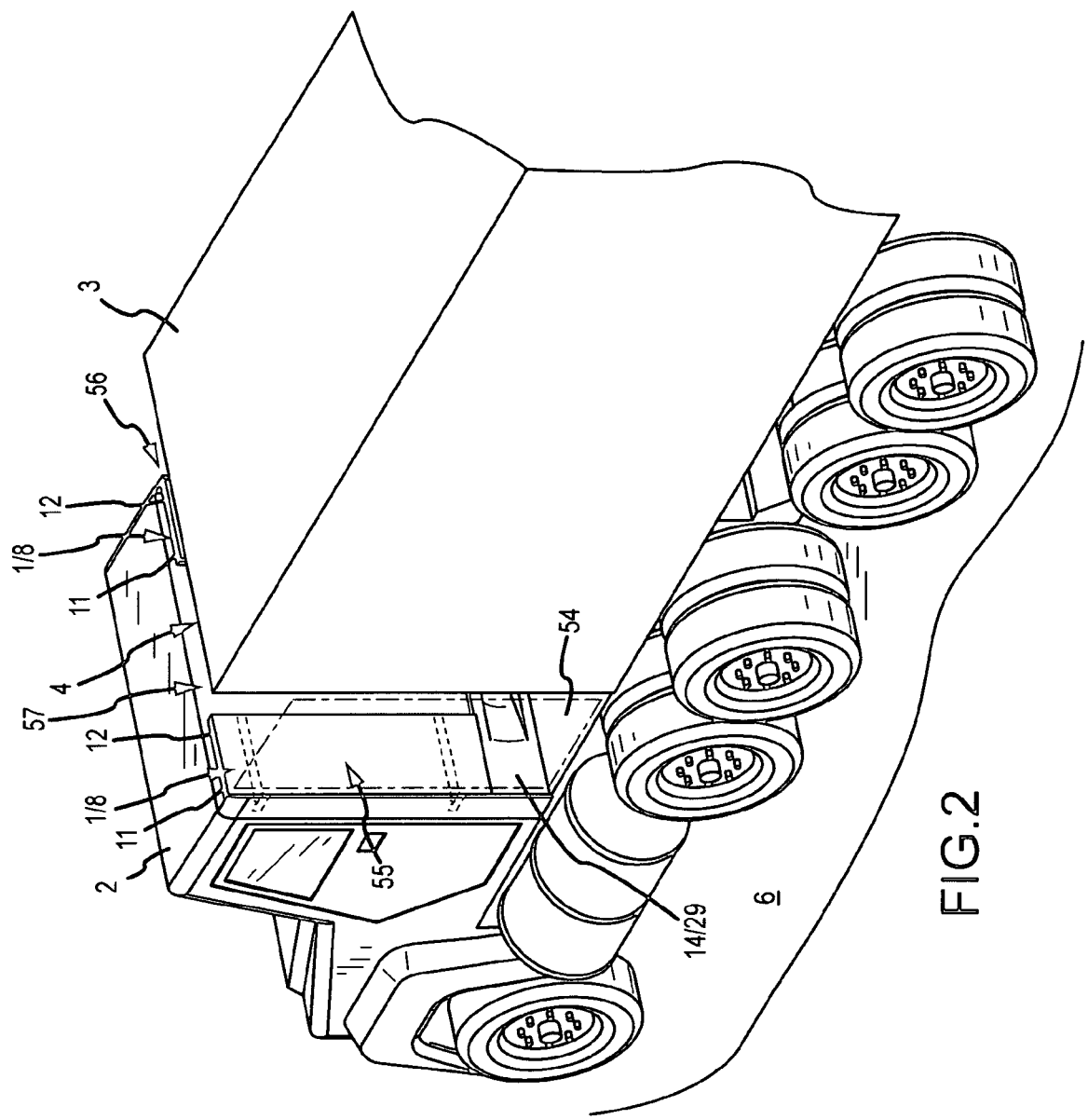
FIG. 2 is a perspective drawing of a particular embodiment of the inventive air dam established in the open condition.

Now referring primarily to FIGS. 1 and 2, which shows a method of using a particular embodiment of the inventive air dam (1). A truck (2) can be coupled to a trailer (3) which generates an open space (4) between the truck (2) coupled to the trailer (3). The term "truck" or "trucks" (2) in accordance with the invention refers to the towing portion of a truck-trailer vehicle. In North America, the truck (2) usually has 3 axles, the front, or steer axle having two wheels, and each of the two rear drive axles having a pair of double wheels on each side. Thus, the most common configuration of truck (2) has ten wheels. A smaller truck (2) having a single drive axle is often used to pull a shorter trailer (3). While FIG. 1 shows a typical ten wheel embodiment of a truck (2), it is not intended that the invention be so limited. Rather, the specific examples of trucks (2) described herein are intended to be illustrative of the numerous and varied configurations of trucks (2) which can be utilized with the invention. The term "trailer" or "trailers" (3) in accordance with the invention refers to the trailer portion of a truck-trailer vehicle. The trailer (3) typically has two "tandem" axles at the rear, each of which has dual wheels, or eight wheels on the trailer (3). There are many types of trailers (3) in use, designed to haul a wide range of products. While FIG. 1 shows a typical eight wheel embodiment of a trailer (3), it is not intended that the invention be so limited. Rather, the specific examples of trailers (3) described herein are intended to be illustrative of the numerous and varied configurations of trailers (3) which can be utilized with the invention.

Now referring primarily to FIG. 2, an open space (4) between the truck (2) and the trailer (3) is generated when the trailer (3) couples to the truck (2). Depending on the particular configuration of the external surface of the truck (2) and the particular configuration of the external surface of the trailer (3), the foot print or area of the deck (54), the configuration of the open space (4) can vary. A part of the external surface of truck (2) and a part of the external surface of the trailer (3) along with the deck (54) of the truck (2) typically defines the boundary of the open space (4). The boundary of the open space (4) will typically define a first side access (55) and a second side access (56) on opposed sides of the open space (4). The first side access (55) and the second side access (56) can vary in configuration depending upon the type of truck (2) and the type of trailer (3) coupled together. The boundary of the open space (4) can also define a top access (57) having a location a distance above and opposed to the surface of the deck (54).

Again referring primarily to FIG. 2, the inventive air dam (1) can be established in the open condition (8) which allows ingress and egress from the open space (4) between the truck (2) and the trailer (3) through the first side access (55) (the first side access (55) is open) or through the second side access (56) (the second side access (56) is open). Now referring primarily to FIGS. 1 and 5, the inventive air dam (1) can be established in the closed condition (9) by operation of an air dam panel actuator (10) which generates travel (13) (see for example FIG. 4) in a first air dam panel (11) and a second air dam panel (12) between the open condition (8) (above-described) and the closed condition (9) to close the corresponding first side access (55) or second side access (56) of the open space (4) on each side of the truck-trailer (2)(3). While a pair of air dam panels (11)(12) are shown mounted in each of the first side access (55) and the second side access (56) in the embodiment of the air dam (1) shown in the Figures, the invention is not so limited and a single air dam panel, a pair of air dam panels, or a plurality of air dam panels can be utilized in embodiments of the air dam (1). As to certain embodiments of the invention, the inventive air dam (1) can be in the closed condition (9) as to the first side access (55) and in the open condition (8) as to second side access (56), or vice-versa, as to particular applications further described below.

Again referring primarily to FIG. 1, as the truck-trailer (2)(3) travels (5) over a support surface (6) an air stream (7) can be generated which fluidically engages a part or all of the surface of the truck-trailer (2)(3) (although only a part of the air stream (7) is depicted by the arrow shown in FIG. 1). By diverting a part of the air stream (7) through an air diversion element (14) an open space air stream (15) can be developed in the open space (4) established between the truck (2) and the trailer (3) which egresses from the top of the open space (4) when the air dam (1) is in the closed condition (9) as to the first side access (55) and as to the second side access (56). By egress from the top of the open space (4) the open space air stream (15) influences directional flow of the air stream (7) coincident with the top access (57) of the open space (4) to reduce disruption of the air stream (7) by the open space (4) established between the truck (2) and the trailer (3). Again referring primarily to FIG. 1, by establishing the air dam panels (11)(12) in the closed condition (9) on either side of the open space (4), disruption of the air stream (7) fluidicly engaged with each side of the truck-trailer (2)(3) can be reduced. Alternately, there may be certain circumstances in which the closed condition (9) of the air dam (1) as to only the first side access (55) or only the second side access (56) may be desired. In that event, diverting a part of the air stream (7) through the corresponding one diversion element (14) can develop an open space air stream (15) which influences the directional flow of the air stream (7) on the opposite first side access (55) or second side access (56) as well as the top access (57).

Figure 3:
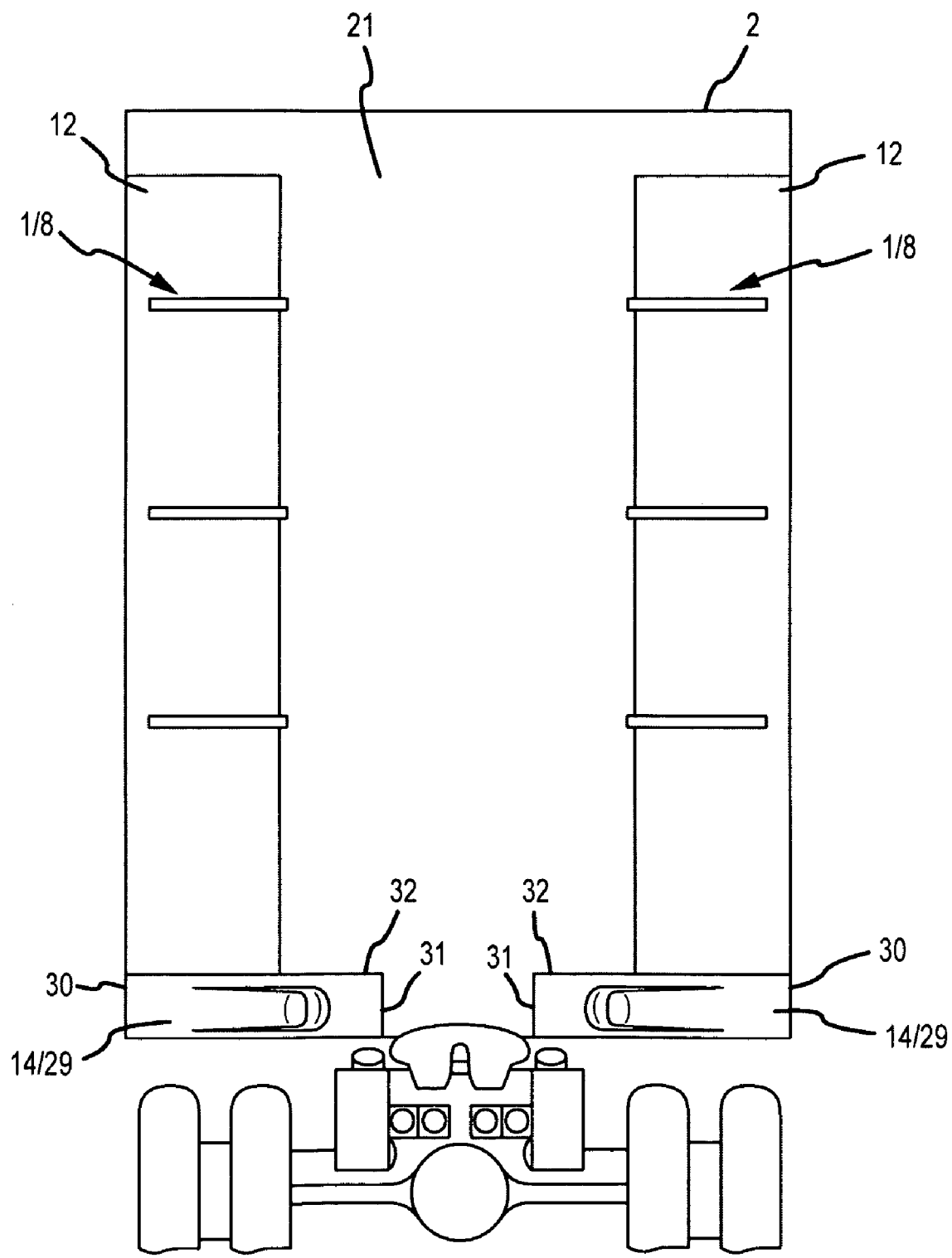
FIG. 3 is back side view of the truck showing a particular embodiment of the inventive air dam invention in the closed condition.

Now referring primarily to FIGS. 2 and 3, when the truck-trailer (2)(3) is stationary the air dam (1) can be established in the open condition (8) to allow ingress by way of the first side access (55) or the second side access (56) to the open space (4) established between the truck (2) and the trailer (3).

Figure 4:
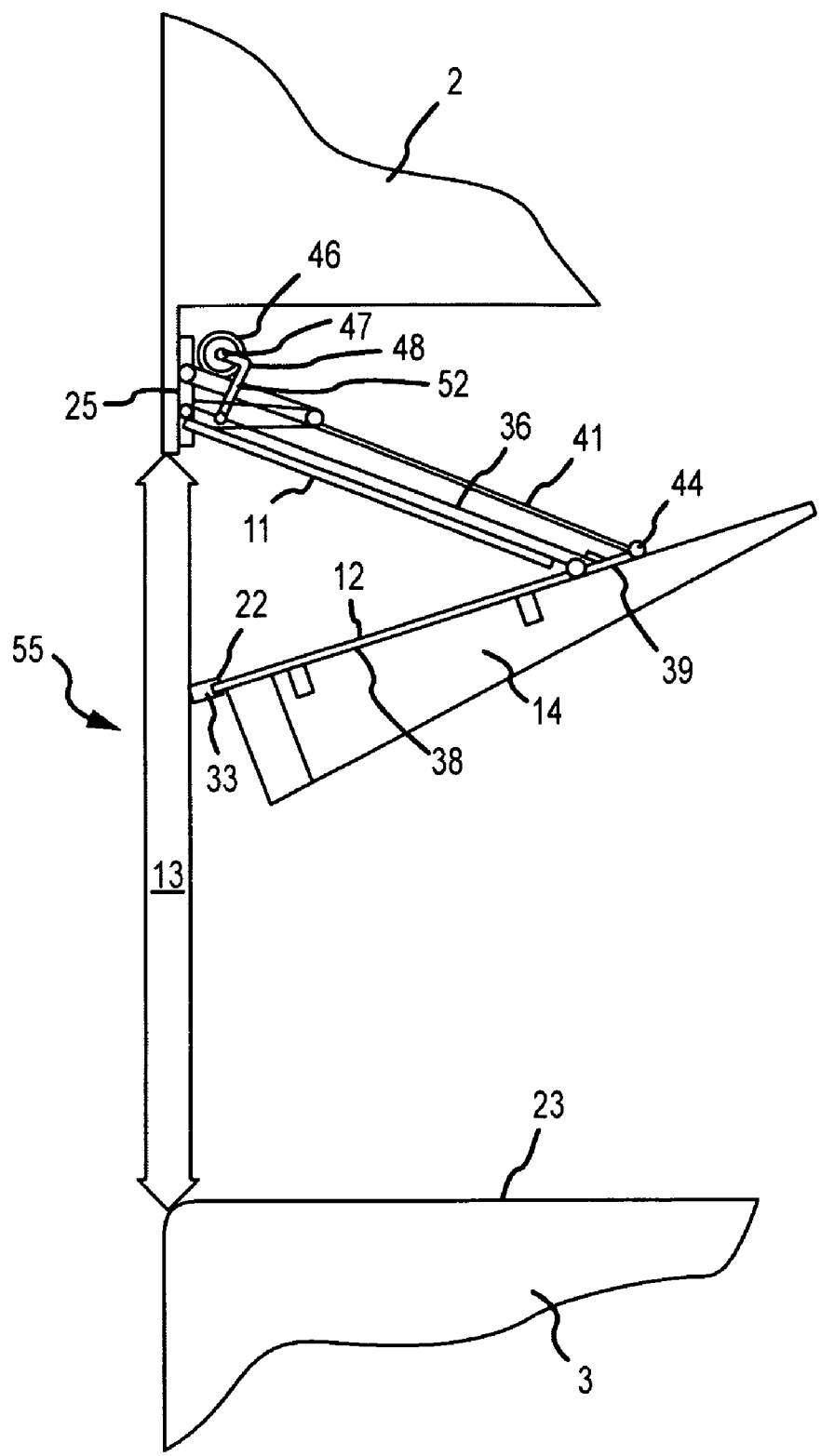
FIG. 4 is a partial top view of the truck and the trailer with the open space established between with a particular embodiment of the inventive air dam being operated between the open condition and the closed condition.
Figure 5:
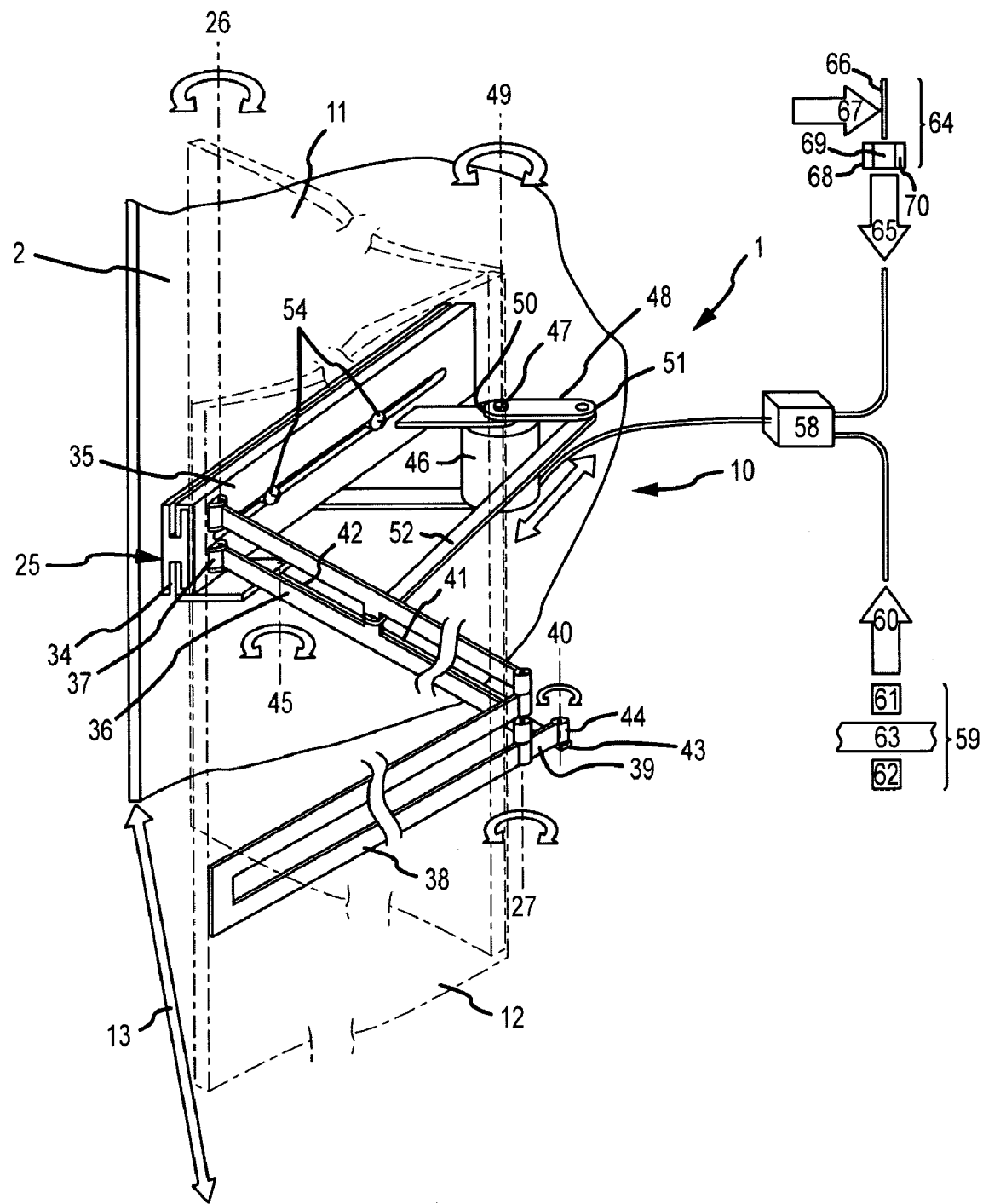
FIG. 5 is a perspective view of a particular embodiment of an air dam actuator which generates travel in embodiments of the air dam between the open condition and the closed condition.

Now referring primarily to FIGS. 4 and 5, a particular embodiment of the inventive air dam (1) can include on each side of the truck-trailer (2)(3) a pair of air dam panels (11)(12) operably coupled to the truck (2) or to the trailer (4) to travel (13) between the closed condition (9) as shown in FIG. 1 and the open condition (8) as shown in FIG. 2 to close or open the first side access (54) and the second side access (55). Each of the pair of air dam panels (11)(12) mounted in the first side access (54) and the second side access (55) can provide a generally rectangular configuration having a thickness which locates a pair of external panel surfaces in opposed substantially planar relation a distance apart. Each of the pair of air dam panels (11)(12) can be produced from a sheet material of plastic, metal, fiberglass, or the like, the invention is not so limited. Depending on the sheet material used to produce the air dam panel (11)(12), one or more stiffener elements (24) can be coupled to the air dam panel (11)(12) to reduce flexure. The stiffener elements (24) can be attached to the air dam panel by mechanical fasteners or the pair of air dam panels (11)(12) and stiffener elements (24) can produced as a single integral piece. Alternately, the stiffener element (24) can be incorporated as a part or functionality of the air dam panel actuator (10) further described below.

Each of the pair of air dam panels (11)(12) can have sufficient height (whether or not utilized with the air diversion element (14)) to locate the top edge (16) proximate with height of the truck top (17) and locate the bottom edge (18) (whether or not utilized with the air diversion element (14)) with the height of the deck of the truck (19). The pair of air dam panels (11)(12) can have sufficient width to allow a first side edge (20) of the first of the pair of air dam panels (11) to locate proximate the external surface of the back of the truck (21) (see FIG. 3) and a second side edge (22) of the second of the pair of air dam panels (12) to locate proximate to the external surface of the front of the trailer (23).

Again referring primarily to FIGS. 4 and 5, a first of the pair of air dam panels (11) can have the first side edge (20) pivotally coupled either directly, or indirectly by a support member (25), to the truck (2) or to the trailer (3) depending upon the embodiment of the invention. Pivotal coupling of the first of the pair of air dam panels (11) allows rotation about a first pivot axis (26). A first edge of a second of the pair of air dam panel (12) can be pivotally coupled directly or indirectly to the second edge ( ) of the first of the pair of air dam panels (11) allowing rotation about a second pivot axis (27). Rotation of the first of the pair of air dam panels (11) about the first pivot axis (26) and rotation of the second of the pair of air dam panels (12) about the second pivot axis (27) allows operation of the air dam (1) between the open condition (8) and the closed condition (9) as above-described. In the closed condition (9), a seal element (33) can sealably couple the first side edge (20) of the first of the pair of air dam panels (11) to the external surface of the truck (2) and the second side edge (22) of the second of the pair of air dam panels (12) to the external surface of the trailer (3). The seal element (33) can further provide sealable engagement of the first of the pair of air dam panels (11) and the second of the pair of air dam panels (12) in the closed condition (8).

Now referring primarily to FIG. 3, which shows an embodiment of the air dam (1) in the open condition (8). An embodiment of the air diversion element (14) can be coupled to the bottom of the first air dam panel (11) to allow the air diversion element (14) to travel in response to the operation of the first air dam panel (11) between the open condition (8) and the closed condition (9) to locate the air diversion element (14) in an operable condition (28) (as shown in FIG. 1) and in an inoperable condition (29) (as shown in FIG. 2 and FIG. 3). The operable condition (28) of the air diversion element (14) sealably couples the first air diversion element end (30) to the truck (3) and sealably couples the second air dam diversion element end (31) to the trailer (3). The term "sealably coupled" encompasses a sealing means sufficient to establish the open space air stream (15) in the operable condition (28) of the air diversion element (28) in the closed condition (9) of the air dam (1).

While FIG. 3 shows the air diversion element (14) coupled to the second air dam panel (11), the invention is not so limited and as to embodiments of the air dam (1) having a first air dam panel (11) and a second air dam panel (12) the air diversion element (14) can be coupled to either to the first air dam panel (11) or the second air dam panel (12). Operation of the air dam (1) to the open condition (8) (as shown in FIG. 3) can disengage a part of the top air diversion element edge (32) from the bottom edge of second air dam panel (12). Alternately, the air diversion element (14) can have fixedly or removably fixed location which sealably couples a first air diversion element end (30) to the truck (2) and a second air diversion element end to the trailer (3) allowing the bottom edges of the air dam panels (11)(12) to engage the top air diversion element edge (32).

Now referring primarily to FIGS. 4 and 5, which shows a non-limiting embodiment of the air dam (1) which includes a pair of air dam panels (11)(12) each rotatable about a corresponding one pivot axes (26)(27). The air dam (1) as shown can further include an air dam panel actuator (10). The term "air dam panel actuator" encompasses any means which operates to generate travel in the first of the pair of air dam panels (11) about pivot axis (25) and in the second of the pair of air dam panels (12) about pivot axis (27) to generate travel (13) of the air dam (1) between the open condition (8) and the closed condition (9). One embodiment of the air dam panel actuator (10) includes one or more support members (25) engaged with the surface of the truck (2) or the trailer (3). The embodiment of the support member (25) shown in FIG. 5 includes a stationary support member (34) engaged to a removable support member (35). The stationary support member (34) can be fixed at a location on the truck (2) by one or a plurality of stationary support member fasteners (not shown) including without limitation mechanical fasteners such as screws or bolts or can be integral with a part of the truck (2). The removable support member (35) can be configured to slidely engage the stationary member (34) allowing disengagement of the removable support member (35) from the stationary member (34). However the invention is not limited to the two piece support member (25) shown in FIG. 5 and the support member (25) can provide a one piece support member (25) secured to the truck (2) or the trailer (3) by fasteners (54). The support member (25) can be configured in any manner which allows fixed engagement with the truck (2) or trailer (3) (depending on the embodiment of the air dam (1)) at a location which allows a first actuator arm (36) to rotate about a first actuator arm pivot (37) coupled to the support member (25) while engaged to the first air dam panel (11) to generate travel of the first of the pair of air dam panels (11) about the pivot axis (26). A second actuator arm (38) can be pivotally coupled to the first actuator arm (36) and engage the second of the pair of air dam panels (12) to generate travel about pivot axis (27). As to certain embodiments of the air dam (1) the first of the pair of air dam panels (11) can be supportingly engaged to the first actuator arm (36) (or a plurality of first actuator arms depending on the application) without other mechanical engagement to the truck (2) or the trailer (3). While as to other embodiments of the air dam (1) the first of the pair of air dam panels (11) can be supportingly engaged to the truck (2) or the trailer (3) with the first actuator arm (36) having engagement only sufficient to generate travel (13) in the first of the pair of air dam panels (11). Similarly, the second of the pair of air dam panels (12) can be supportingly engaged by the second actuator arm (38) or supportingly engaged to the second edge of the first of the pair of air dam panels (11). Understandably, supporting engagement could be in part by the coupling to the truck (2) or trailer (3) and in part by the first actuator arm (36) and the second actuator arm (38). The second actuator arm (38) can further include a lever arm (39) which extends from the second actuator arm (38) to terminally rotate about pivot axis (40). Rotation of the lever arm (39) about pivot axis (40) generates rotational travel of the second of the pair of air dam panels (12) about pivot axis (27). A lever arm actuator (41) has a first end (42) rotationally coupled at a location proximate to the support member (25) which allows travel of the lever arm actuator about pivot axis (45). The second end (43) of the lever arm actuator (41) rotationally couples to the lever arm terminal (44) to rotate about pivot axis (40). The lever arm actuator (41) can have an adjustable fixed length and as the first air dam panel (11) travels (13) toward the closed condition (9) pivot axis (27) can be placed at a greater distance from pivot axis (45) about which the first end (42) of the lever arm actuator (41) rotationally engages which requires rotation of the lever arm about pivot axis (27) which generates travel of the second air dam panel (12) toward the closed condition (9). The air dam panel actuator (10) can further include shaft rotation generator (46) which rotates a shaft (47). A suitable shaft rotation generator (46) for use with the invention can without limitation be a Norgren, Rotary Vane Actuator, Model M/60288. The shaft (47) couples to a member (48) having a first end (50) which rotates about axis (49). The second member end (51) pivotally couples to reciprocating member (52) which travels (53) in response to rotation of the shaft (47) to forcibly urge the first actuator arm (36) about pivot axis (26) to generate travel (13) in the first of the pair of air dam panels (11) and by coincident action on lever arm (39) generate travel (13) in the second of the pair of air dam panels (12). As to certain embodiments of the inventive air dam (1), the air dam panel actuator (10) can further include a controller (58) which activates the air dam panel actuator (10) to generate travel of the first of the pair of air dam panels (11) and the second of the air dam panels (12) toward the closed condition (9) or toward the open condition (8). The controller (58) can be a digital computer, computer chip, or extension card used for automation of electromechanical processes, such as control of machinery or in this particular application control of the air dam panel actuator. The programs to control air dam panel actuator (10) operation can be stored in battery-backed or non-volatile memory. The controller (58) operates in real time system with output results produced in response to input conditions within a bounded time. The input condition can be a manually operated toggle, digitally operated toggle, or sensor signals as further described below. A controller (58) suitable for use with the invention for the functionalities further described below can be produced by Digital Delay Systems, 2035 Fillmore Street, Davenport, Iowa. The controller (58) will typically be mounted inside the truck (2) although the invention is not so limited.

Again referring primarily to FIG. 5, the inventive air dam (1) can further include a speed sensor (59) which generates a speed sensor signal (60) which can be received by the controller (58). As one non-limiting example, the speed sensor (59) can comprise an electronic pick up (61) mounted proximate the drive shaft (63) of the truck (2) which senses magnets (62) coupled to the driveshaft (63) of the truck (2) as rotation of the driveshaft (63) brings the magnet(s) (62) proximate the electronic pickup (61). A speed sensor (59) as above described compatible with the controller (58) also above-described can be obtained from Digital Delay Systems, 2035 Fillmore Street, Davenport, Iowa. The controller (58) in part functions to analyze the speed sensor signal (60) to determine the speed of the truck (2) coupled to the trailer (3). The controller (58) can be programmed to activate the air dam actuator (10) within certain ranges of speed. As non-limiting example, the controller (58) can be programmed to establish the pair of air dam panels (11)(12) mounted in the first side access (55) and the second side access (56) (or either one of the pairs of air dam panels) in the in the open condition (8) when the truck-trailer (2)(3) has a speed of between zero miles per hour and about thirty miles per hour. Although, any particular range or ranges of miles per hour can be programmed in which the air dam panel or panels are in the open condition (8). The controller (58) can further be programmed to establish the air dam panels or the pair of air dam panels (11)(12) mounted in the first side access (55) and the second side access (56) (or either one air dam or either of the pairs of air dam panels) to be established in the in the closed condition (9) when the truck-trailer (2)(3) has a speed in the range of about thirty miles per hour and seventy miles per hour, or above a certain speed (for example above about fifty miles per hour). As to certain embodiments, the air dam panel (or pair of air dam panels (11)(12)) mounted in the first side access (55) and the air dam panel mounted in the second side access (56) can be separately programmed in the controller (58) to operate independent of the other based on speed of the truck-trailer (2)(3).

Again referring primarily to FIG. 5, certain embodiments of the air dam (1) can further include a wind speed sensor (64) which generates a wind speed sensor signal (65) which can be received by the controller (58). As one non-limiting example, the wind speed sensor (64) can comprise a vertical member (66) which moves based on the speed of the wind (67). The greater the speed of the wind (67) the greater the movement of the vertical member (66). The wind speed sensor (64) can further include one or more electronic pick ups (68) mounted within the housing of the wind speed sensor (64). One or more magnets (69) can be coupled to the vertical member (66) which are sensed by the electronic pickup as the vertical member (66) moves in response to the speed of the wind (67). The controller (58) as one non-limiting example can be programmed to activate the air dam actuator (10) within certain ranges of speed of the wind (67). As non-limiting example, the controller (58) can be programmed to establish the pair of air dam panels (11)(12) mounted in the first side access (55) and the second side access (56) (or either one of the pairs of air dam panels) in the closed condition (9) when the speed of the wind (67) is between zero miles per hour and about twenty five miles per hour. Although, any particular range or ranges of miles per hour can be programmed to match the closed condition (9) of the air dam panel or panels. The controller (58) can further be programmed to establish the air dam panels or the pair of air dam panels (11)(12) mounted in the first side access (55) and the second side access (56) (or either one air dam or either of the pairs of air dam panels) to be established in the in the closed condition (9) when the wind speed in the range of about thirty miles per hour and seventy miles per hour, or above a certain wind speed (for example above about fifty miles per hour). As to certain embodiments, the air dam panel (or pair of air dam panels (11)(12)) mounted in the first side access (55) and the air dam panel mounted in the second side access (56) can be separately programmed in the controller (58) to operate independent of the other based on speed of the wind (67).

The wind speed sensor (64) can further include a wind direction sensor element (70) which can include locating a plurality of the electronic pick ups (68) about the magnet (69) coupled to the vertical member (66) such that the directional movement of the vertical member (66) in response to direction of the wind (67) generates corresponding direction movement of the magnet (69) in relation to the plurality electronic pick ups (68). Each pick up generating a part of the wind sensor signal (65). The controller (58) can be programmed to assess the relative contribution of each pick up in the wind sensor signal (65) to analyze direction of the wind (67). The controller (58) can be further programmed to match direction of the wind (67) to activation of the air dam actuator (10) to establish for a given direction of the wind (67) the condition (whether open condition (8) or closed condition (9)) of each air dam panel or pair of air dam panels (11)(12) in each of the first side access (55) and the second side access (56). As a non-limiting example, if the direction of the wind (67) is substantially perpendicular to the truck-trailer (2)(3), it may be desirable to have the air dam panels (11)(12) in the open condition (8). The controller (58) can be further programmed to activate the air dam panels based on various combinations and permutations of information related to speed of the truck-trailer (2)(3), speed of the wind (67) and direction of the wind (67) to correspondingly establish the air dam panels in the open condition (8) or the closed condition (9).

Now referring to Table 1 which sets out the miles per gallon of diesel fuel obtained by the same truck-trailer (2)(3) operated utilizing the inventive air dam (1) as compared with operation without the inventive air dam (1).

In Trials 1-4 set out in Table 1 a 2003 Volvo 770 was utilized as the truck-trailer (2)(3). In each of Trials 1 and 2 an embodiment of the inventive air dam (1) was installed on the truck-trailer (2)(3). In each of Trials 3 and 4 the inventive air dam was not installed on the truck-trailer (2)(3). As to each of Trials 1-4 the same number miles were traveled on the same trial course. The miles per hour and trial time duration were held substantially the same for Trials 1 and 3 and Trials 2 and 4.

TABLE 1

EFFECT OF AIR DAM ON FUEL MILEAGE

| Trial # | A/B/C/D | Set Speed | Elapsed Time | Miles Traveled | MPG | Air Dam |
|---|---|---|---|---|---|---|
| 1 | B | 59 | 19:59 | 20 | 8.84 | On |
| 2 | C | 70 | 17:00 | 20 | 9.64 | On |
| 3 | B | 59 | 19:58 | 20 | 8.7 | Off |
| 4 | C | 70 | 16:59 | 20 | 8.1 | Off |

As can be understood from the results set out in Table 1, Trials 1 and 2 which were conducted with the inventive air dam (1) installed achieved greater miles per gallon of fuel than Trials 3 and 4 which were conducted without the inventive air dam (1) installed.

As can be easily understood from the foregoing, the basic concepts of the present invention may be embodied in a variety of ways. The invention involves numerous and varied embodiments of an air dam for a truck-trailer and methods of making and using such air dam for a truck-trailer. As such, the particular embodiments or elements of the invention disclosed by the description or shown in the figures accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "actuator" should be understood to encompass disclosure of the act of "actuating"—whether explicitly discussed or not—and, conversely, were there effectively disclosure of the act of "actuating", such a disclosure should be understood to encompass disclosure of a "actuator" and even a "means for actuating." Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

Thus, the applicant(s) should be understood to claim at least: i) each of the air dam devices herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof or to obtain any benefit of reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

In addition, the claims set forth below are intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

I claim:

1. An air dam for a truck-trailer, comprising:
a) a truck;
b) a trailer coupled to said truck, wherein said truck coupled to said trailer defines an open space between said truck and said trailer having a first side access and a second side access at opposed sides of said open space; and
c) a pair of air dam panels mounted in each of said first side access and said second side access, wherein a first one of said pair of air dam panels has a first edge and a second edge, said first edge pivotally coupled in relation to said external surface of said truck, said second edge pivotally coupled to a first edge of a second one of said pair of air dam panels, whereby said first one of said pair of air dam panels and said second one of said pair of air dam panels pivotally fold inwardly to dispose a pair of panel surfaces in opposed relation within said open space to open the corresponding said first side access or said second side access and said pair of air dam panels pivotally unfold outwardly to close the corresponding said first side access or said second side access of said open space.

2. The air dam for a truck-trailer as described in claim 1, further comprising an air dam actuator coupled to each said pair of air dam panels which operates to pivotally fold said first one of said pair of air dam panels and said second one of said pair of air dam panels inwardly to locate said pair of external panel surfaces in opposed relation within said open space to open the corresponding said first side access or said second side access of said open space and pivotally unfold outwardly to close the corresponding said first side access or said second side access of said open space.

3. The air dam for a truck-trailer as described in claim 2, further comprising:
   a) a speed sensor which generates a speed sensor signal corresponding to the speed of said truck coupled to said trailer; and
   b) an air dam actuator controller which receives said speed sensor signal and further functions to activate said air dam actuator coupled to each said pair of panels based upon speed of said truck coupled to said trailer.

4. The air dam for a truck-trailer as described in claim 3, wherein said air dam actuator controller which receives said speed sensor signal further functions to activate said air dam actuator coupled to each said pair of panels at a predetermined speed of said truck coupled to said trailer.

5. The air dam for a truck-trailer as described in claim 4, further comprising:
   a) a wind speed sensor which generates a wind speed sensor signal corresponding to the wind speed about said truck coupled to said trailer; and
   b) an air dam actuator controller which receives said wind speed sensor signal and further functions to activate said air dam actuator coupled to each said pair of panels at a predetermined wind speed about said truck coupled to said trailer.

6. The air dam for a truck-trailer as described in claim 5, further comprising
   a) a wind direction sensor which generates a wind direction sensor signal corresponding to the wind direction about said truck coupled to said trailer; and
   b) an air dam actuator controller which receives said wind direction sensor signal and further functions to activate said air dam actuator coupled to each said pair of panels at a predetermined wind direction about said truck coupled to said trailer.

7. The air dam for a truck-trailer as described in claim 6, further comprising an air diversion element coupled to said pair of air dam panels, wherein extension of said pair of air dam panels locates said air diversion element to divert a part of the air stream surrounding said truck coupled to said trailer into said open space between said truck and said trailer.

8. A method of providing an air dam for a truck-trailer, comprising the steps of:
   a) coupling a truck to a trailer, wherein said truck coupled to said trailer defines an open space between said truck and said trailer having a first side access and a second side access at opposed sides of said open space and a top access at the top of said open space;
   b) mounting a pair of air dam panels in each of said first side access and said second side access, wherein a first of said pair of air dam panels has a first edge and a second edge, said first edge pivotally couples in relation to said external surface of said truck and said second edge pivotally couples to a first edge of a second of said pair of air dam panels to pivotally fold inwardly to dispose a pair of external panel surfaces in opposed relation within said open space; and
   c) unflolding said first and said second of said pair of air dam panels mounted in each of said first side access and said second side access between an external surface of said truck and the external surface of said trailer to close the corresponding said first side access and said second side access at opposed sides of said open space.

9. The method of providing an air dam for a truck-trailer as described in claim 8, further comprising the step of retracting said at least one air dam panel between the external surface of said truck and the external surface of said trailer to open the corresponding said first side access and said second side access at opposed sides of said open space.

10. The method of providing an air dam for a truck-trailer as described in claim 9, further comprising the step of coupling an air dam actuator to each of said pair of air dam panels which operates to generate rotation of said first of said pair of air dam panels in relation to said external surface of said truck and further generates rotation of said second of said pair of air dam panels in relation to said first air dam panel, whereby said first of said pair of air dam panels and said second of said air dam panels pivotally fold inwardly to dispose a pair of external panel surfaces in opposed relation within said open space to open the corresponding first side access and second side access and pivotally unfold outwardly to close the corresponding first side access and second side access of said open space.

11. The method of providing an air dam for a truck-trailer as described in claim 10, further comprising the steps of:
   a) sensing speed of said truck coupled to said trailer;
   b) generating a signal corresponding to the speed of said truck coupled to said trailer; and
   c) controlling activation of said air dam actuator coupled to each of said pair of air dam panels based upon speed of said truck coupled to said trailer.

12. The method of providing an air dam for a truck-trailer as described in claim 11, further comprising the steps of:
   a) sensing speed of said truck coupled to said trailer;
   b) generating a signal corresponding to the speed of said truck coupled to said trailer; and
   c) controlling activation of said air dam actuator coupled to each of said pair of air dam panels based upon speed of said truck coupled to said trailer.

13. The method of providing an air dam for a truck-trailer as described in claim 12, further comprising the steps of:
   a) sensing the wind speed about said truck coupled to said trailer;
   b) generating a signal corresponding to said wind speed about said truck coupled to said trailer;
   c) controlling activation of said air dam actuator coupled to each of said pair of air dam panels based upon wind speed about said truck coupled to said trailer.

14. The method of providing an air dam for a truck-trailer as described in claim 13, further comprising the steps of:
   a) sensing the wind direction about said truck coupled to said trailer;
   b) generating a signal corresponding to said wind direction about said truck coupled to said trailer;
   c) controlling activation of said air dam actuator coupled to each of said pair of air dam panels based upon wind direction about said truck coupled to said trailer.

15. The method of providing an air dam for a truck-trailer as described in claim 14, further comprising the steps of:
   a) coupling an air diversion element to said pair of air dam panels mounted between the external surface of said truck and said external surface of said trailer; and
   b) unfolding said pair of air dam panels to correspondingly locate said air diversion element in said first side access or said second side access of said open space to divert a part of the air stream surrounding said truck coupled to said trailer into said open space between said truck and said trailer.

16. A method altering an air stream about a truck coupled to a trailer, comprising the steps of:
   a) closing at least one of a first side access and a second side access of an open space between a truck coupled to a trailer by operation of at least one air dam panel, said air dam panel having an air diversion element;

b) locating said air diversion element in operable relation with said at least one of said first side access and said second side access by operation of said at least one air dam panel;
c) engaging a part of said air stream about said truck coupled to said trailer with said air diversion element;
d) diverting said part of said air stream about said truck coupled to said trailer into an open space between said truck coupled to said trailer;
e) generating a flow of said part of said air stream diverted into said open space proximate a bottom of said open space toward a top access of said open space to alter said air stream about said truck coupled to said trailer.

* * * * *